(12) United States Patent
Yasuda (10) Patent No.: US 7,716,200 B2
(45) Date of Patent: May 11, 2010

(54) IMAGE MANAGEMENT APPARATUS (75) Inventor: Tomonaga Yasuda, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 254 days.

(21) Appl. No.: 11/501,428

(22) Filed: Aug. 9, 2006

(65) Prior Publication Data

US 2007/0061376 A1 Mar. 15, 2007

(30) Foreign Application Priority Data

Sep. 14, 2005 (JP) ............................. 2005-267091

(51) Int. Cl.
G06F 17/30 (2006.01)
(52) U.S. Cl. ..................... 707/706; 707/756; 348/231.2; 386/124
(58) Field of Classification Search ................. 707/200, 707/3; 380/200; 386/52, 64, 68–69, 124; 348/231, 231.2
See application file for complete search history.

(56) References Cited

U.S. PATENT DOCUMENTS

2001/0024562 A1* 9/2001 Nomura et al. ............... 386/52
2005/0237396 A1* 10/2005 Hagiwara et al. ...... 348/231.99
2006/0020627 A1* 1/2006 Poslinski .................. 707/104.1
2006/0093863 A1* 5/2006 Tsuchiya et al. ............ 428/827
2006/0115241 A1* 6/2006 Saigo et al. .................. 386/124
2006/0222177 A1* 10/2006 Iwamoto et al. ............. 380/200
2006/0248105 A1* 11/2006 Goradia ...................... 707/102
2006/0291811 A1* 12/2006 Suzuki et al. .................. 386/95

FOREIGN PATENT DOCUMENTS

JP 2003-244606 8/2003

* cited by examiner

Primary Examiner—Don Wong
Assistant Examiner—Hanh B Thai
(74) Attorney, Agent, or Firm—Volpe and Koenig, P.C.

(57) ABSTRACT

An image management apparatus storing an input primary image and a replay-use reduced image corresponding to the input image comprises a first storage medium; a first database makeup unit for making up first database information for identifying a group to which the reduced image belongs when recording the primary image in the first storage medium; a second recording medium; a duplication unit for duplicating first database information and a reduced image recorded in the second recording medium into the first recording medium when the remainder capacity of, or the number of recorded files in, the second recording medium meets a predetermined condition; and a second database makeup unit for deleting first database information and a reduced image which are duplicated into the first recording medium from the second recording medium and also making up second database information for identifying the duplicated first database information in the second recording medium.

4 Claims, 9 Drawing Sheets

FIG. 1

DBDB0001.ODB

| [filepath] | [earliest date] | [latest date] |
|---|---|---|
| SRCHDB/IMDB0001.ODB | 2003/01/18 | 2003/03/21 |
| SRCHDB/IMDB0002.ODB | 2003/03/22 | 2003/04/01 |
| SRCHDB/IMDB0003.ODB | 2003/04/02 | 2003/07/19 |
| SRCHDB/IMDB0004.ODB | 2003/08/01 | 2003/11/19 |
| SRCHDB/IMDB0005.ODB | 2003/11/20 | 2003/12/31 |
| SRCHDB/IMDB0006.ODB | 2004/01/01 | 2004/04/11 |
| SRCHDB/IMDB0007.ODB | 2004/04/21 | 2004/07/14 |
| SRCHDB/IMDB0008.ODB | 2004/08/11 | 2004/10/09 |
| SRCHDB/IMDB0009.ODB | 2004/10/22 | 2004/12/31 |
| SRCHDB/IMDB00010.ODB | 2005/01/01 | 2005/01/22 |
| ... | ... | ... |

FIG. 2

IMDB0001.ODB

| [filepath] | [date] | [aparture] | [shutter] | [protect] | [filesize] |
|---|---|---|---|---|---|
| /DCIM/100OLYMP/PB180001.JPG | 2003/01/18 | 3.2 | 1/60 | 1 | 81124 |
| /DCIM/100OLYMP/PB180002.JPG | 2003/01/18 | 10 | 1/15 | 0 | 79445 |
| /DCIM/100OLYMP/PB190003.JPG | 2003/01/19 | 10 | 1/15 | 0 | 80998 |
| /DCIM/100OLYMP/PB190004.JPG | 2003/01/19 | 10 | 1/60 | 0 | 76876 |
| /DCIM/100OLYMP/PB200005.JPG | 2003/02/20 | 2.8 | 1/15 | 0 | 89345 |
| /DCIM/100OLYMP/PB200006.JPG | 2003/02/20 | 16 | 1/500 | 1 | 76989 |
| /DCIM/100OLYMP/PB210007.JPG | 2003/02/21 | 22 | 1/60 | 0 | 80032 |
| /DCIM/100OLYMP/PB210008.JPG | 2003/02/21 | 2.8 | 1/30 | 0 | 79324 |
| /DCIM/100OLYMP/PB220009.JPG | 2003/03/21 | 2.8 | 1/500 | 0 | 80987 |
| /DCIM/100OLYMP/PB220010.JPG | 2003/03/21 | 3.2 | 1/60 | 0 | 79985 |
| ... | ... | ... | ... | ... | ... |

IMDB0001.ODB

| [filepath] | [date] | [aparture] | [shutter] | [protect] | [filesize] |
|---|---|---|---|---|---|
| /DCIM(DB)/1000LYMP/PB180001.JPG | 2003/01/18 | 3.2 | 1/60 | 1 | 81124 |
| /DCIM(DB)/1000LYMP/PB180002.JPG | 2003/01/18 | 10 | 1/15 | 0 | 79445 |
| /DCIM(DB)/1000LYMP/PB190003.JPG | 2003/01/19 | 10 | 1/15 | 0 | 80998 |
| /DCIM(DB)/1000LYMP/PB190004.JPG | 2003/01/19 | 10 | 1/60 | 0 | 76876 |
| /DCIM(DB)/1000LYMP/PB200005.JPG | 2003/02/20 | 2.8 | 1/15 | 0 | 89345 |
| /DCIM(DB)/1000LYMP/PB200006.JPG | 2003/02/20 | 16 | 1/500 | 1 | 76989 |
| /DCIM(DB)/1000LYMP/PB210007.JPG | 2003/02/21 | 22 | 1/60 | 0 | 80032 |
| /DCIM(DB)/1000LYMP/PB210008.JPG | 2003/02/21 | 2.8 | 1/30 | 0 | 79324 |
| /DCIM(DB)/1000LYMP/PB220009.JPG | 2003/03/21 | 2.8 | 1/500 | 0 | 80987 |
| /DCIM(DB)/1000LYMP/PB220010.JPG | 2003/03/21 | 3.2 | 1/60 | 0 | 79985 |
| ... | ... | ... | ... | ... | ... |

| NONVOLATILE MEMORY AREA | Root DIRECTORY | FIRST LAYER | SECOND LAYER |
|---|---|---|---|
| COMMON | DBDB0001.ODB | | |
| A | IMDB0001.ODB | | |
| | DCIM | 1000LYMP | PB180001.JPG |
| | | | PB180002.JPG |
| | | | PB190003.JPG |
| | | | PB190004.JPG |
| | | | PB200005.JPG |
| | | | PB200006.JPG |
| | | | PB210007.JPG |
| | | | PB210008.JPG |
| | | | PB220009.JPG |
| | | | PB220010.JPG |
| | | | ... |
| | | 1010LYMP | ... |
| | | ... | ... |
| B | IMDB0002.ODB | | |
| | DCIM | 1100LYMP | PC180001.JPG |
| | | | PC180002.JPG |
| | | | PC190003.JPG |
| | | | PC190004.JPG |
| | | | PC200005.JPG |
| | | | PC200006.JPG |
| | | | PC210007.JPG |
| | | | PC210008.JPG |
| | | | PC220009.JPG |
| | | | PC220010.JPG |
| | | | ... |
| | | 1110LYMP | ... |
| | | ... | ... |

F I G. 5

| HDD AREA | Root DIRECTORY | FIRST LAYER | SECOND LAYER | |
|---|---|---|---|---|
| | SRCHDB | IMDB0001.ODB | | |
| | | IMDB0002.ODB | | |
| | | ... | | |
| | DCIMDB | 100OLYMP | PB180001.JPG | ⎫ |
| | | | PB180002.JPG | |
| | | | PB190003.JPG | |
| | | | PB190004.JPG | |
| | | | PB200005.JPG | |
| | | | PB200006.JPG | REDUCED IMAGE FILES |
| | | | PB210007.JPG | |
| | | | PB210008.JPG | |
| | | | PB220009.JPG | |
| | | | PB220010.JPG | |
| | | | ... | |
| | | 101OLYMP | ... | |
| | | ... | ... | ⎭ |
| | DCIM | 100OLYMP | PB180001.JPG | ⎫ |
| | | | PB180002.JPG | |
| | | | PB190003.JPG | |
| | | | PB190004.JPG | |
| | | | PB200005.JPG | |
| | | | PB200006.JPG | PRIMARY IMAGE FILES |
| | | | PB210007.JPG | |
| | | | PB210008.JPG | |
| | | | PB220009.JPG | |
| | | | PB220010.JPG | |
| | | | ... | |
| | | 101OLYMP | ... | |
| | | ... | ... | ⎭ |

IMAGE MANAGEMENT APPARATUS

CROSS-REFERENCE TO RELATED APPLICATIONS

This application is based upon and claims the benefit of priority from the prior Japanese Patent Application No. 2005-267091 filed on Sep. 14, 2005, the entire contents of which are incorporated herein by reference.

BACKGROUND OF THE INVENTION

1. Field of the Invention

The present invention relates to an image management apparatus suitable for searching a desired image in a high speed from a large capacity storage medium storing a large volume of large capacity information such as an image.

2. Description of the Related Art

Widely known as an image management apparatus is a digital video disk player (simply "DVD player" hereinafter) or digital camera with a built-in hard disk drive (simply "HDD" hereinafter).

An HDD applied in a DVD player or digital camera is a high cost performance and a large capacity as compared to a storage medium, constituted by a semiconductor device, such as an xD-picture card ("xD" is a registered trademark) and an SD memory card ("SD" is a registered trademark). Therefore, the HDD is an effective storage medium when tens of thousands of images are desired to be stored.

Particularly, digital cameras have been progressing to provide ever finer pixel images in recent years. Also, desires to photograph many images are present. This has prompted to progress in providing large capacity storage media, thus greatly benefiting the use of an HDD. For instance, if a digital camera becomes capable of storing a large number of images therein, it provides a benefit of eliminating a need to back up the images in a personal computer (PC), et cetera. Other benefit includes a view of images photographed previously just by carrying such a digital camera.

Incidentally, a patent document 1 (Laid-Open Japanese Patent Application Publication No. 2003-244606), as an example of a technique related to the above described, notes a digital camera which records image data in a rewrite limited storage medium (i.e., a storage medium, et cetera, allowing only one time writing) and records its data management information in an embedded memory in the case of the rewrite limited storage medium being attached to a mounting part of the camera.

SUMMARY OF THE INVENTION

An image management apparatus according to the present invention, being one storing an input primary image and a replay-use reduced image corresponding to the input image, comprises a first storage medium for recording the primary image when the primary image is input; a first database makeup unit for making up first database information for identifying a group to which the reduced image belongs when recording the primary image in the first storage medium; a second recording medium for recording the reduced image and first database information; a duplication unit for duplicating first database information and a reduced image recorded in the second recording medium into the first recording medium when the remainder capacity of, or the number of recorded files in, the second recording medium meets a predetermined condition; and a second database makeup unit for deleting first database information and a reduced image which are duplicated into the first recording medium from the second recording medium and also making up second database information for identifying the duplicated first database information in the second recording medium.

DESCRIPTION OF THE PREFERRED EMBODIMENTS

The following is a description of the preferred embodiment of the present invention while referring to the accompanying drawings by exemplifying a digital camera.

Figure 1:
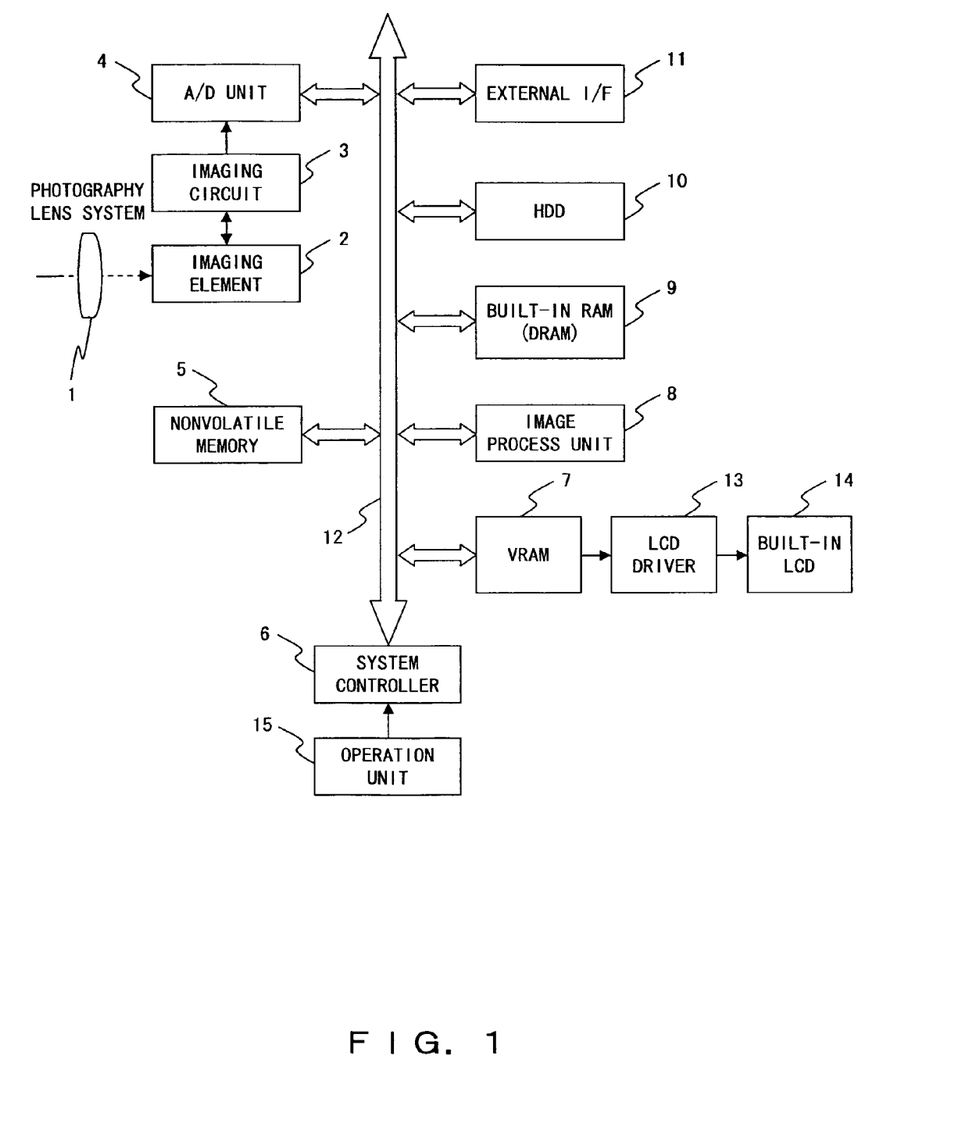
FIG. 1 is a diagram showing a primary configuration of a digital camera as an image management apparatus according to an embodiment.

FIG. 1 is a diagram showing a primary configuration of a digital camera as an image management apparatus according to an embodiment. Note that the digital camera according to the present embodiment is premised to be compliant to a Design rule for Camera File system (DCF) standard.

Referring to FIG. 1, an object image passing through a photography lens system 1 is focused on an image plane of an imaging element 2. The imaging element 2 converts the optical image into an electric signal. An imaging circuit 3 applies a prescribed imaging process to the electric signal. An A/D unit 4 applies an analog-to-digital (A/D) conversion to the electric signal applied by the imaging process. This process obtains image data that is digital data.

Meanwhile, an A/D unit 4, nonvolatile memory 5, a system controller 6, video RAM (VRAM) 7, an image process unit 8, built-in RAM 9, an HDD 10 and an external interface (I/F) 11 are all connected to a bus 12, thereby enabling mutual data exchanges.

The built-in RAM 9 is memory used as a temporary storage for image data obtained from the A/D unit 4, that for image data in process by the image process unit 8 and a work area for executing a control process by the system controller 6. The built-in RAM 9 is Dynamic Random Access Memory (DRAM) for example.

The nonvolatile memory 5 stores a digital camera program for controlling an operation of the entirety of the relevant digital camera, a first database file for building up a first database which is made up for searching an image in a high speed, an image file of a reduced image for a replay use (noted as "reduced image" hereinafter), which is a reduced image file of a primary image (i.e., an original image) recorded in the HDD 10, and other information. Note that, as a database, reduced images linked to file paths corresponding to primary images which have been imaged within a predefined period of time, or primary images which have been imaged in a collective event such as a field trip, or et cetera are written in the first database file. The first database file and image file of a reduced file are described in detail later.

The system controller 6 comprises a central processing unit (CPU) therein. The system controller 6 has the relevant CPU reads and executes a digital camera program recorded in the nonvolatile memory 5, thereby controlling the entirety of the relevant digital camera.

The image process unit 8 performs for example an image data compression process when recording image data and an image data expansion process when reading compressed image data. The image process unit 8 performs for example a JPEG (Joint Photographic Experts Group) compression/expansion process as the compression/expansion process.

The HDD 10 is a built-in type drive apparatus comprising a large capacity hard disk. The HDD 10 records an image file of a primary image, an image file of the above noted reduced image, the above noted database file, et cetera.

The VRAM 7 stores display-use image data. An LCD driver 13 drives a built-in LCD 14 which displays an image represented by image data stored in the VRAM 7 for example, under a control of the LCD driver 13.

The external I/F 11 is disposed for enabling a data exchange by way of a USB cable, for example, with an external apparatus such as a PC.

An operation unit 15 comprises a series of buttons and switches such as a power on/off button, a release button for issuing photo start instruction, a mode dial switch for instructing a mode such as photo mode and replay mode, and an x-y button (i.e., the left, right, top and bottom buttons) for issuing a frame advance instruction for replay images. The operation unit 15 notifies the system controller 6 of a received instruction.

The next is a detailed description of an image search function of the digital camera with the configuration as described above.

The digital camera according to the present invention is contrived to have the nonvolatile memory 5 store reduced images which are linked to primary images which have been imaged within a predefined period of time or primary images imaged in each predefined event, et cetera and image-use database (i.e., the first database) thereof. This enables a high speed search of a desired reduced image if the selected reduced image exists in an image-use database within the nonvolatile memory 5.

And performed are to move (or delete after a duplication) a reduced image within the nonvolatile memory 5 and the corresponding database file (i.e., the first database) to the HDD 10 under a predefined condition and describe the fact of moving in a database-use database file (i.e., a second database) This enables a search of a database-use database file, thereby making it possible to easily search a desired image from among a large number of images recorded within the HDD 10 even if a selected reduced image does not exist in the image-use database file within the nonvolatile memory 5.

As described above, there are two kinds of database files, i.e., an image-use database file ("IMDB**.ODB") describing a reduced image corresponding to a primary image recorded in the HDD 10 and a database-use database file ("DBDB.ODB") describing the image-use database file, which are used in the relevant digital camera. The database-use database file is a moved (or deleted after a duplication) history database for an image-use database file which has been moved (or deleted after a duplication) to the HDD 10 from the nonvolatile memory 5** under a predefined condition.

Figure 2:
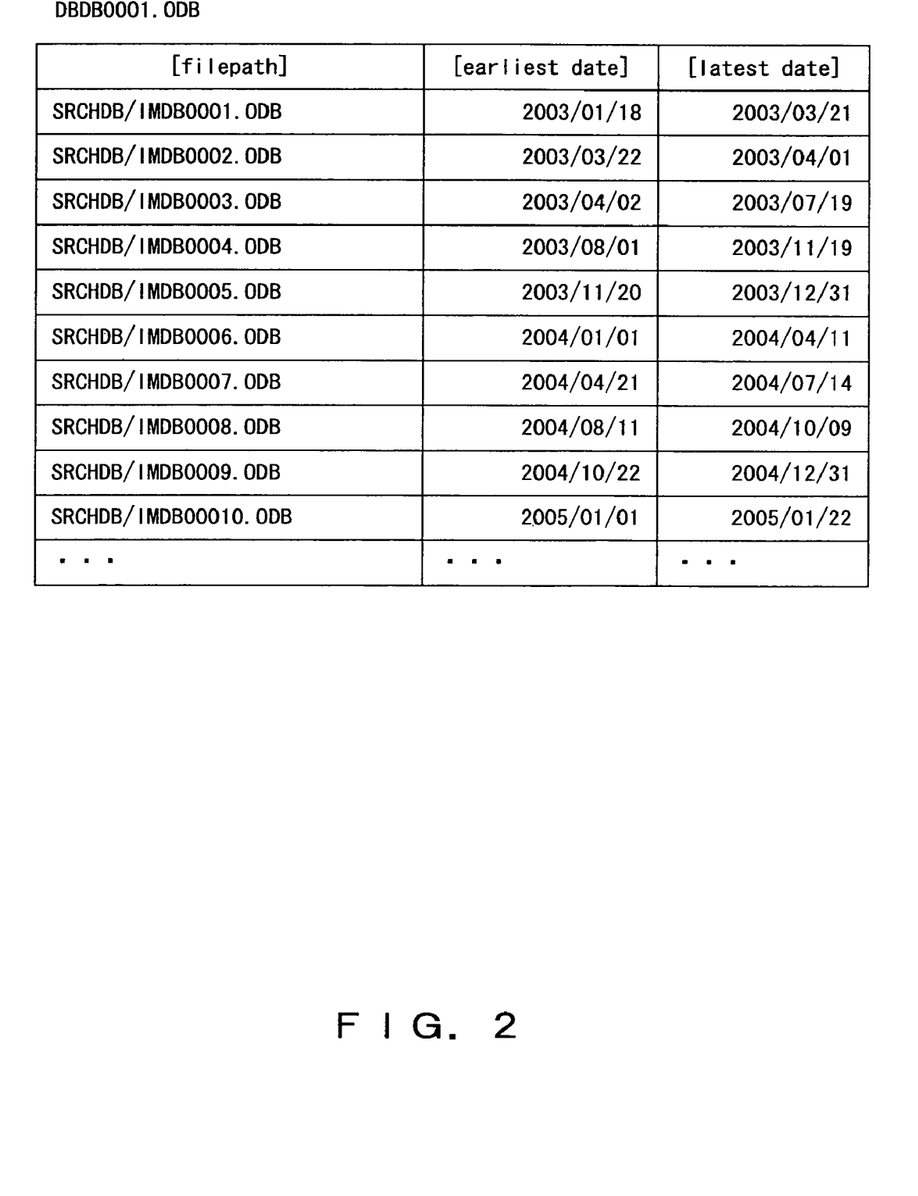
FIG. 2 is a diagram exemplifying a content of a database-use database file.

FIG. 2 is a diagram exemplifying a content of a database-use database file stored in the nonvolatile memory 5. As described above, the database-use database file is a moved (or deleted after a duplication) history database for an image-use database file which has been moved (or deleted after a duplication) to the HDD 10 from the nonvolatile memory 5 under a predefined condition.

As shown in FIG. 2, registered in the aforementioned image-use database file (i.e., "DBDB0001.ODB" in the example shown in FIG. 2) is an image-use database file which has been moved (and deleted after a duplication) to the HDD 10. This is described "file path", "earliest date" and "latest date" for each of the aforementioned image-use database file.

The "file path" is a file path within the HDD 10 for indicating an existence position of an image-use database file duplicated into the HDD 10. The "earliest date" indicates a photographed date of a primary image whose photographed date is the oldest among the primary images corresponding to reduced images for each of the image-use database files. Likewise, the "latest date" indicates a photographed date of a primary image whose photographed date is the newest among the primary images corresponding to the reduced images.

This configuration makes it apparent that images photographed in the period between Jan. 18, 2003 and Mar. 21, 2003 are registered in the image-use database file "IMDB0001.ODB" which is registered in the database-use database file shown in FIG. 2, for example.

Incidentally in the present embodiment, even if there is a plurality of image files of primary images with the same photographed date in image files of primary images recorded in the HDD 10, the plurality of the image files of primary images may not be necessarily registered in one image-use database file and possibly registered across a plurality of image-use database files instead.

Figure 3:
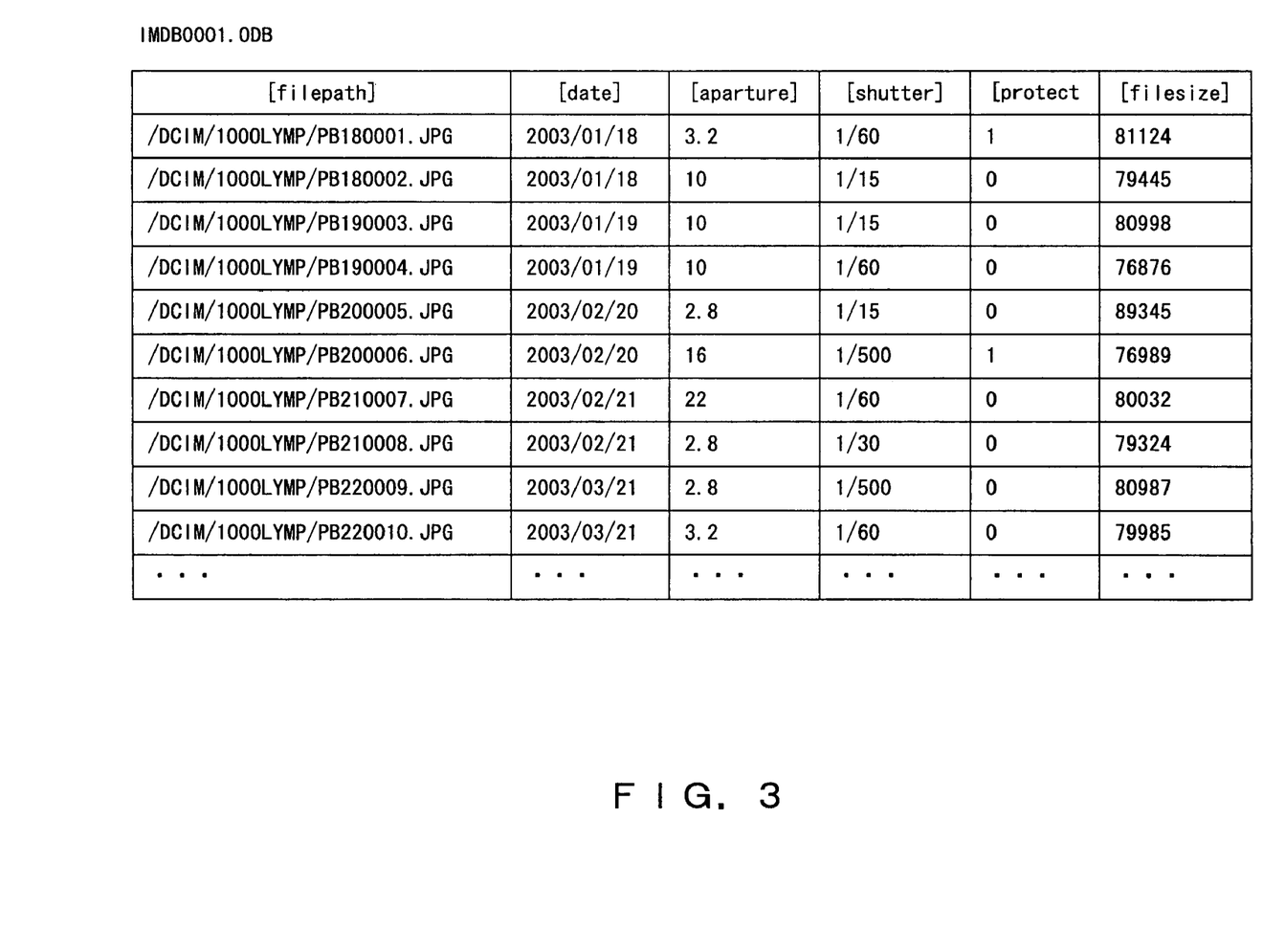
FIG. 3 is a diagram exemplifying a content of an image-use database file recorded in nonvolatile memory.

FIG. 3 is a diagram exemplifying a content of an image-use database file stored in the nonvolatile memory 5. The image-use database file is made up when primary images photographed in a predefined photographing period of time have been stored in the HDD 10, as described later. The image-use database file is a database indicating an existence position, within the nonvolatile memory 5, of a reduced image corresponding to a primary image stored in the HDD 10.

As shown in FIG. 3, described in the image-use database file (i.e., "IMDB0001.ODB" in the example shown in FIG. 3) are a file path ("file path") of a reduced image corresponding to a primary image stored in the HDD 10, a photographed date ("date") of a primary image corresponding to the reduced image, an aperture value ("aperture") at the time of photographing the primary image, a shutter speed ("shutter") at the time of photographing the primary image, information ("protect") (i.e., 1: protected; 0: unprotected) indicating whether or not the image file of the primary image is protected, and a size of an image file ("file size") of the primary image. Here, the "file size" is used when calculating a spare capacity of the HDD 10, for example.

Note that when recording an image file of a reduced image in the nonvolatile memory 5, the recording is carried out in the form of a file path within the nonvolatile memory 5 being approximately identical with a file path of an image file of a primary image within the HDD 10 corresponding to the reduced image according to the present embodiment. That is, a file path, within the HDD 10, indicating an existence position of an image file of a primary image stored in the HDD 10 and a file path, within the nonvolatile memory 5, indicating an existence position of an image file of a reduced image, which is a reduction of the primary image, are expressed by the same description, except for the root directory, as described later.

That is, the image-use database file exemplified in FIG. 3 is recorded in the nonvolatile memory 5, and therefore the file path of an image file of a primary image is identical with the file path of an image file of a reduced image which is a reduction of the primary image. This makes it possible to read an image file of a primary image from the HDD 10 and an image file of a reduced image, which is a reduction of the primary image, from the nonvolatile memory 5 according to the file path.

Figure 4:
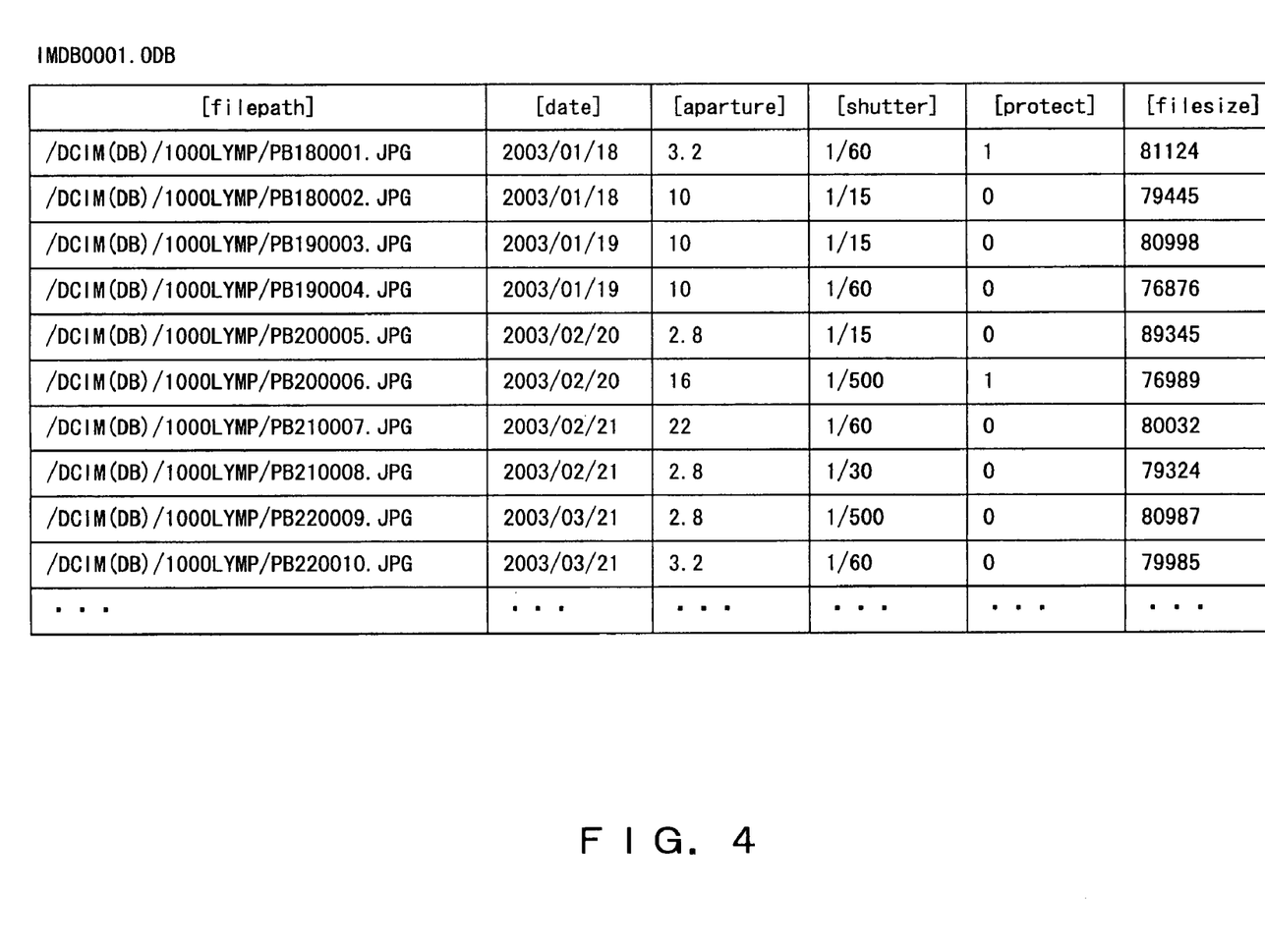
FIG. 4 is a diagram exemplifying an image-use database file recorded in an HDD.

FIG. 4 is a diagram exemplifying an image-use database file duplicated into the HDD 10.

The image-use database file is made up when duplicating a reduced image file and an image-use database file which are stored in the nonvolatile memory 5 into the HDD 10 under a predefined condition.

As shown by FIG. 4, also described in the aforementioned image-use database file ("IMDB0001.ODB" in the example shown by FIG. 4) are "file path", "date", "aperture", "shutter", "protect" and "file size" for each reduced image file in the same manner as the pre-duplication image-use database file shown by FIG. 3.

As shown by the "file path" in FIG. 4, the file path of an image file of the duplicated reduced image within the HDD 10 is recognized as a file path of an image file of a reduced image within the HDD 10. That is, the recording is carried out in the form (which is described in detail later) of only a folder positioned next to the root directory within the HDD 10 being different from the pre-duplication file path. That is, the file path of an image file of the duplicated reduced image is such that only the folder name positioned immediately under the root directory of the HDD 10 is different, as "DCIM (DB)", in order to make it possible to recognize, by the above noted "file path", the fact of duplicating the reduced image file and image-use database file which are stored in the nonvolatile memory 5 into the HDD 10 under a predefined condition.

This configuration makes it possible to obtain a file path of an image file of a primary image and that of an image file of a reduced image, which is the reduction of the primary image, by referring to a file path described in the post-duplication image-use database file.

The present embodiment is configured to store an image file of a primary image in a folder "DCIM" immediately under the root directory in compliance to the DCF standard, while an image of a reduced image, which is the reduction of the primary image, in a folder "DCIMDB" immediately under the root directory. Because of this, "/DCIM(DB)/ ... .jpg" is described for the "file path" so as to recognize both of the file paths in a later event.

Such a description makes it possible to read an image file of a primary image according to the "/DCIM/ ... .jpg" omitting the "DB" based on the "/DCIM(DB)/ ... .jpg" from the HDD 10. It also makes it possible to read an image file of a reduced image, which is the reduction of the primary image, according to "/DCIMDB/ ... .jpg" omitting "(" and ")" from the "/DCIM(DB)/ ... .jpg" from the HDD 10.

Figure 5:
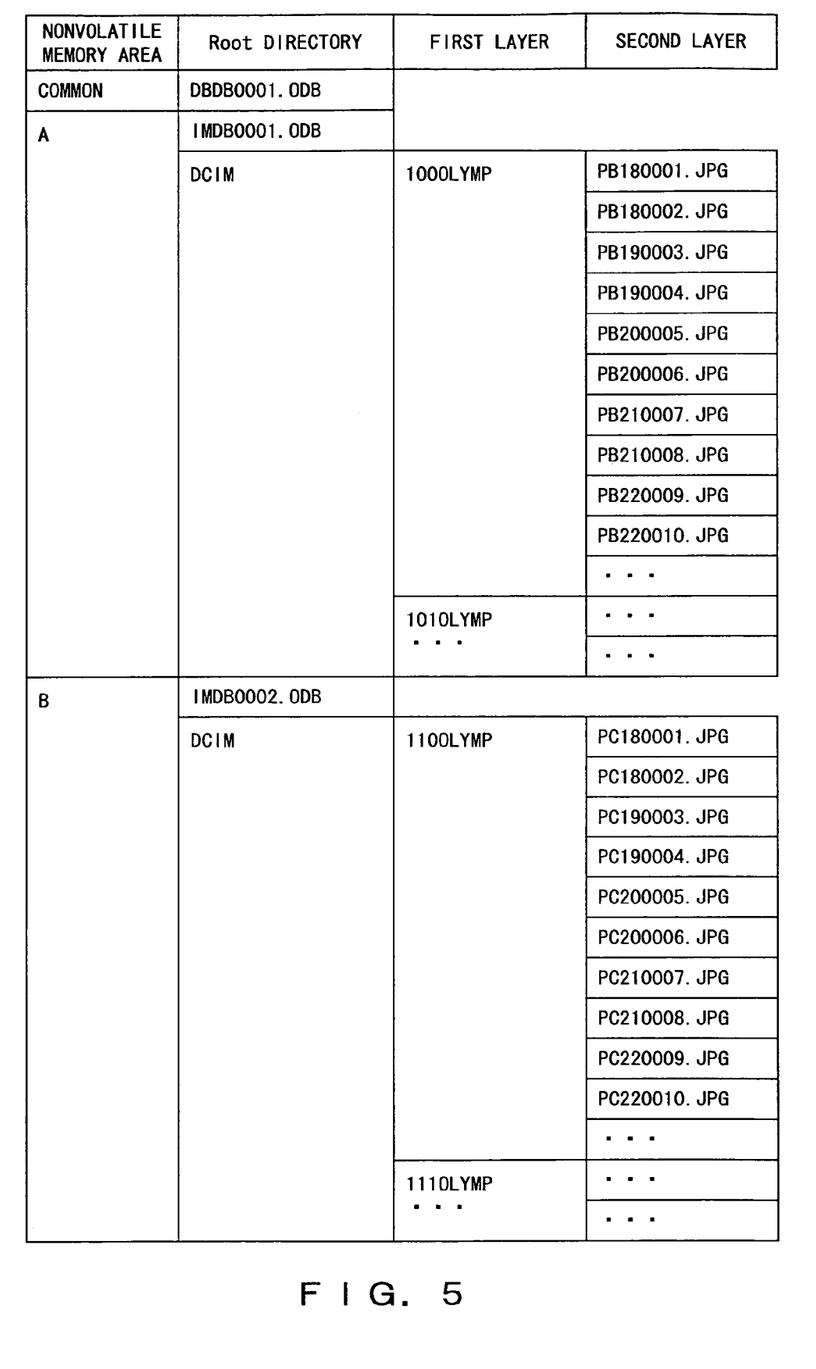
FIG. 5 is a diagram exemplifying a hierarchical layer structure of a partial zone within nonvolatile memory storing a database file and an image file of a reduced image.

FIG. 5 is a diagram exemplifying a hierarchical layer structure of a database file and of an image file of a reduced image stored in the nonvolatile memory 5.

As shown in FIG. 5, apart of an area within the nonvolatile memory 5 recording these files are divided into a common area, an A area, and a B area. Note that making a capacity allocated to these areas larger is preferred for further improving an image search speed.

In the partial area, a database-use database file is recorded in the common area. One image-use database file and an image file of a replay-use reduced file registered in the aforementioned image-use database file are recorded in the A and B areas, respectively.

For example, the image-use database file "IMDB0001.ODB" and the image file (e.g., "PC180001.JPG", et cetera) of a replay-use reduced image relating to an image file of a primary image, which is registered for the aforementioned image-use database file, are recorded in the A area shown in FIG. 5.

Also in the partial area, a database-use database file and an image-use database file are both stored immediately under the root directory. A file path of an image file of a reduced image is recorded in the form of being identical with a file path of an image file of a primary image recorded in the HDD 10 and therefore the image file of the reduced image is stored in a layer of the same form as a layer storing the image file of the primary image recorded in the HDD 10.

For example, the image file PB180001.JPG of a primary image recorded in the HDD 10 is stored in the folder 100OLYMP within the folder DCIM immediately under the root directory of the HDD 10, and therefore the image file "PB180001.JPG" of a reduced image recorded in the A area within the nonvolatile memory 5 shown in FIG. 5 is also stored in the folder 100OLYMP within the folder DCIM immediately under the root directory in the A area.

The present embodiment is configured to equip a partial area within the nonvolatile memory 5 by dividing it into A and B areas as areas recording an image-use database file and an image file of a reduced image registered in the aforementioned image-use database file, and use the A and B areas in sequence. Therefore, the configuration is such that, if the currently used area is the A area, a recording in the B area is not carried out, while if it is the B area, a recording in the A area is not carried out.

It is in other words configured to record an image-use database file and an image file of a reduced image in the A area, and record it in the B area if a predetermined condition, for example, the capacity of the A area or the number of files stored therein is met. Then, if the B area meets the above described predetermined condition, the image-use database file and the image file of the reduced image which are stored in the A area are moved (or deleted after a duplication) to the HDD 10 so as to enable a storage of an image-use database file and an image file of a reduced image to the aforementioned A area in the next such event.

Here, it is configured to set, by using an identifier, as to which of the A and B areas is to be the currently used area. For the identifier, a predefined one bit area is secured within the nonvolatile memory 5, and the A area or B area is set as the currently used area if the value of the one bit area is "0" or "1", respectively. The initial value at the time of shipping the product from a factory is set as "0".

Note that the present embodiment is configured to equip the two areas for recording an image-use database file and an image file of a reduced image registered therewith, it is, however, possible to equip three or more areas for using them in sequence. Such a case is possible by securing approximately one byte of a predefined area within the nonvolatile memory 5 for an identifier according to the number of the areas.

Meanwhile, the present embodiment may be configured, in lieu of definitely dividing a partial area of the nonvolatile memory 5 and using them, to calculate a total capacity of the files in the predefined area and predetermine the upper limit within the range of the file capacity for example, thereby virtually dividing one area for using them.

Figure 6:
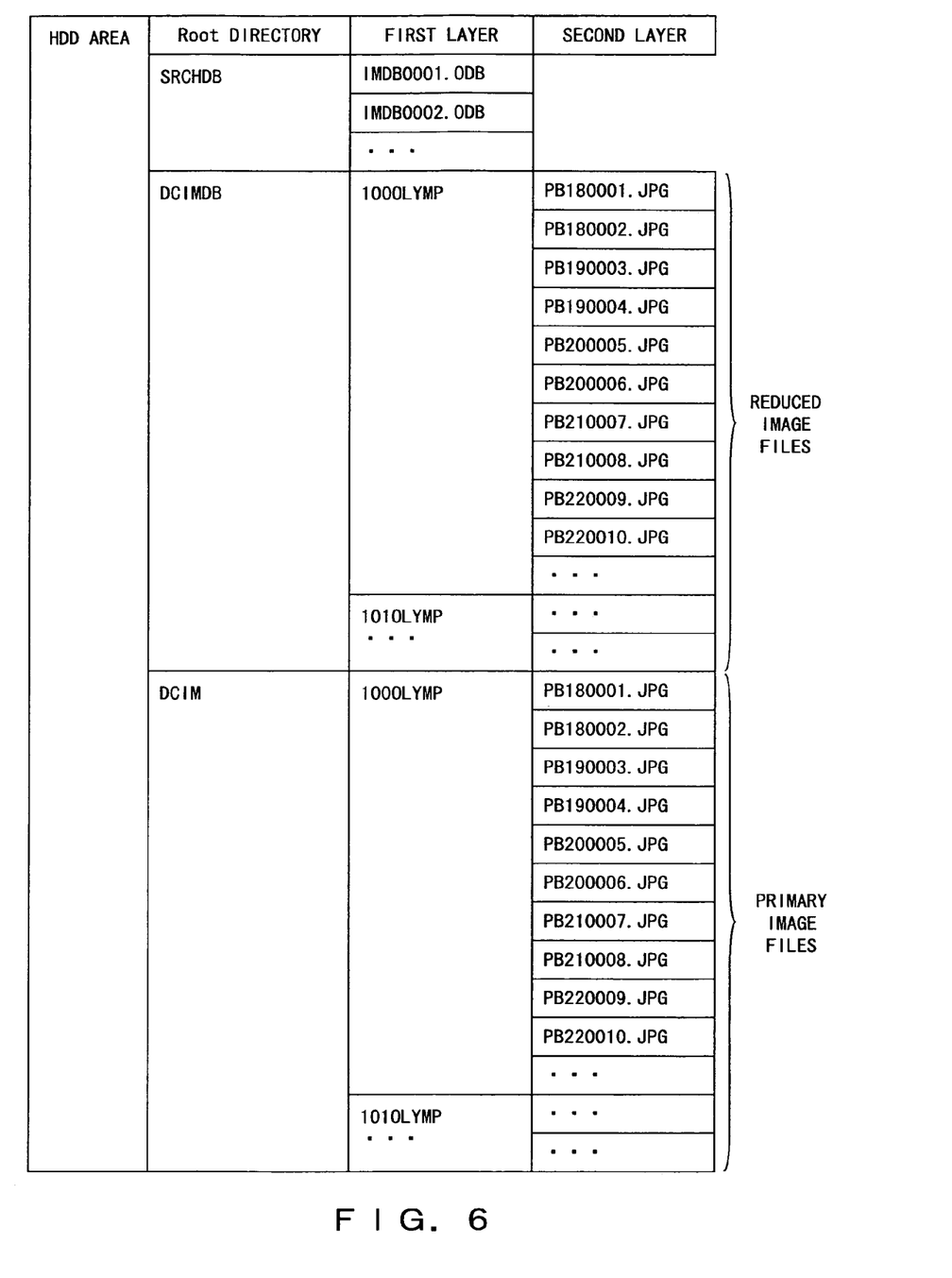
FIG. 6 is a diagram exemplifying a hierarchical layer structure when storing an image-use database file, an image file of a primary image and that of a reduced image in an HDD.

FIG. 6 is a diagram exemplifying a hierarchical layer structure when storing an image-use database file, an image file of a primary image and that of a reduced image in the HDD 10.

Referring to FIG. 6, an image-use database file duplicated from the nonvolatile memory 5 is stored in the folder "SRCHDB" immediately under the root directory. And an image file of a reduced image registered with the image-use database file, which is a file duplicated likewise from the nonvolatile memory 5 together with the image-use database file, is stored in the folder "DCIMDB" immediately under the root directory. And an image file of a primary image recorded in the HDD 10 at the time of an image input such as at photographing is stored in the folder "DCIM" immediately under the root directory in compliance with the DCF standard.

A file path of an image file of a reduced image is recorded in the HDD 10 so that only a folder immediately under the root directory is different compared with a file path of an image file of a primary image corresponding to the reduced image. Therefore, even if it is a folder immediately under the root directory, the folder name is different.

For example, the image file "PB180001.JPG" of a primary image recorded in the HDD 10 shown in FIG. 6 is stored in the folder "100OLYMP" within the folder "DCIM" immediately under the root directory, and the image file "PB180001.JPG" of a reduced image which is the reduction of the primary image is stored in the folder "100OLYMP" within the "DCIMDB" which is a folder immediately under the root directory and of which the folder name is different.

Figure 7:
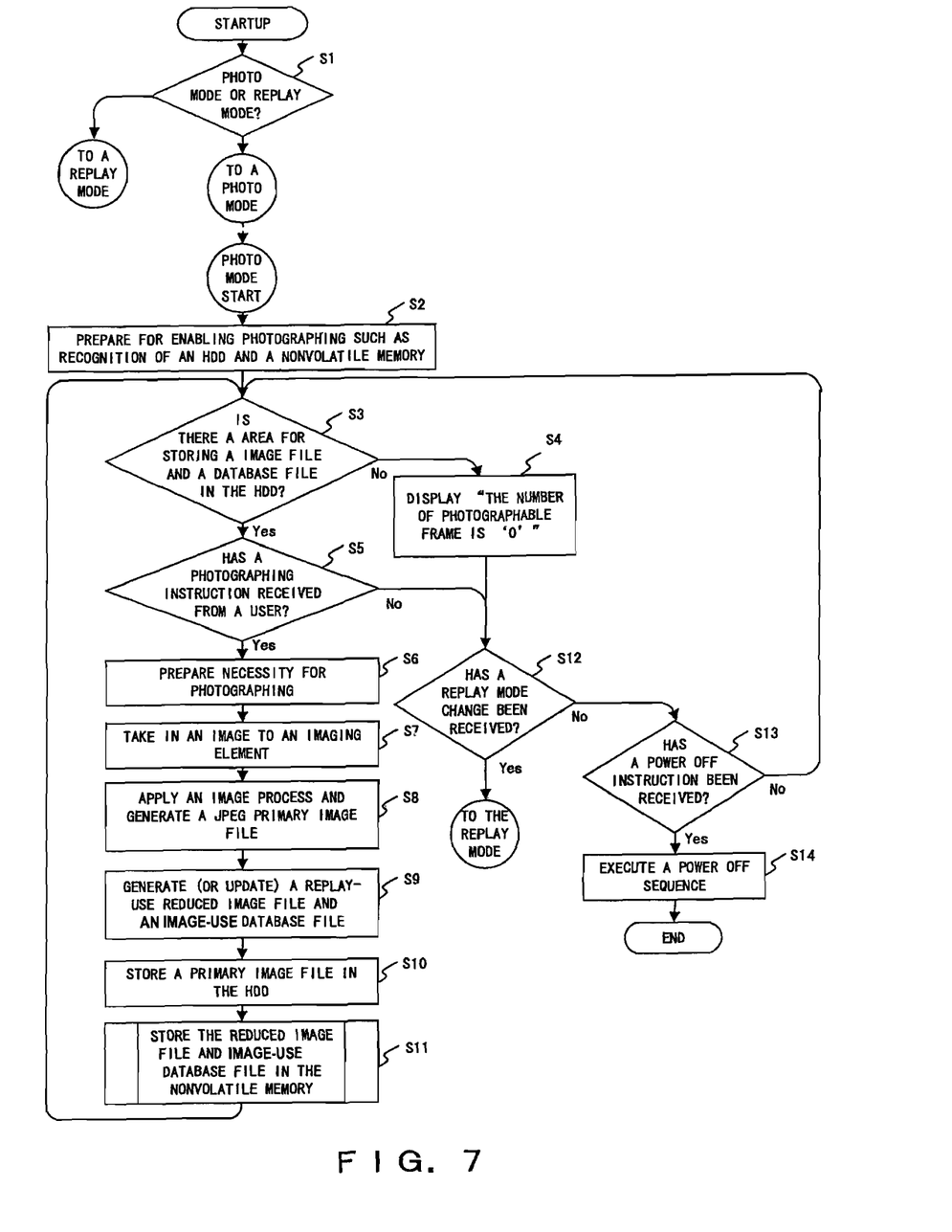
FIG. 7 is a flow chart showing a process content of an operation at the time of a photography (sometimes noted as "photo" hereinafter) mode which carries out a generation or update, et cetera, of a database file.
Figure 8:
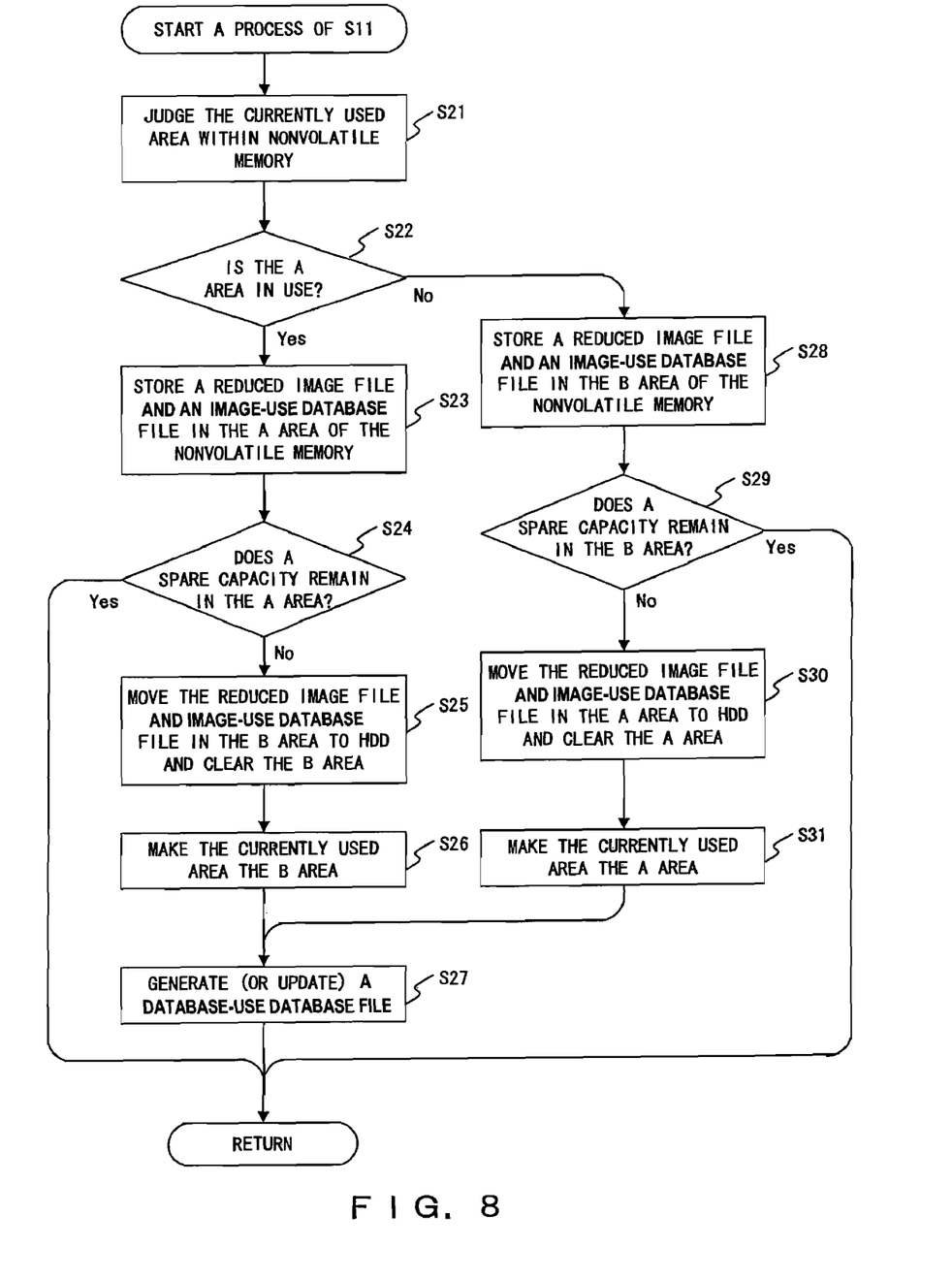
FIG. 8 is a flow chart showing a process content of S11 shown in FIG. 7.
Figure 9:
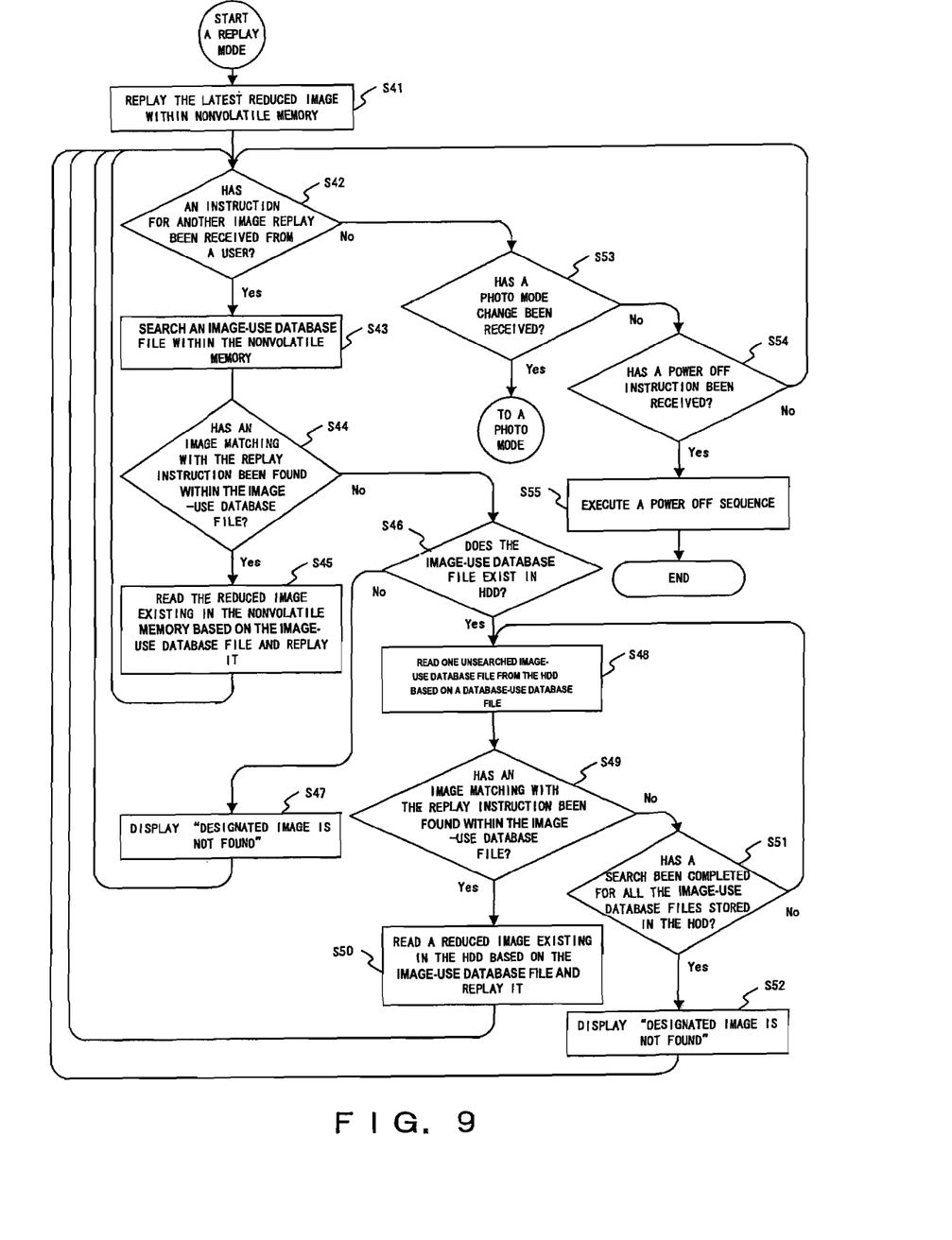
FIG. 9 is a flow chart showing a process content of an operation in the case of a judgment result of S1 shown in FIG. 7 being a replay mode, or in the case of shifting to a replay mode as a result of a judgment of S12 shown in FIG. 7 being "yes".

The next is a detailed description of an operation of the digital camera, that is, an operation relating to a generation or update of the above described database files, and a replay operation including an image search performed by using these database files, by referring to FIGS. 7 through 9 and by exemplifying a digital camera as an image management apparatus.

FIG. 7 is a flow chart showing a process content of an operation at the time of a photo mode which carries out a generation or update, et cetera, of an image-use database file in a digital camera.

Referring to FIG. 7, as the digital camera starts up by the power being turned on, the operation in the first step judges whether a mode instructed by the mode dial switch is a photo mode or a replay mode (S1). If the judgment result points at the photo mode, the operation starts the process of the photo mode in the S2 and thereafter. If the judgment result points at the replay mode, it starts the process of the replay mode in the S41 and thereafter shown in FIG. 9.

The first description is of the case of the judgment result of S1 pointing at the photo mode.

In this case, the first operation is to perform a preparatory process required for photographing and storing an image thereafter such as setting up a lens, turning on the built-in LCD 14, recognizing the HDD 10 and nonvolatile memory 5, determining a file name to be stored next, et cetera (S2).

Then it judges whether or not there is an area for storing an image file and a database file in the HDD 10 (S3). If the judgment result is "no", it displays a message "the number of photographable frame is '0'" (S4), and shifts to the S12.

Contrarily, if the judgment result of S3 is "yes", it then judges whether or not a photo start instruction has been received by a user pressing the release button (S5).

If the judgment result of S5 is "yes", the operation then performs a preparatory process required for photographing including processes such as auto focus (AF) and auto exposure (AE) (S6). Then it takes in an object image to the imaging element 2 (S7). Then it applies a prescribed imaging process to image data corresponding to the object image and generates an image file of a primary image (i.e., the JPEG primary image file shown in FIG. 7) (S8). Note that the image file of the primary image is a file having an adequate content of information as a photo for printing or backing up in an external storage apparatus.

Subsequently, the operation generates an image file of a small capacity, replay-use reduced image which is a reduction of the primary image and also generates an image-use database file registering the replay-use reduced image file (S9). Here, the replay-use reduced image file, corresponding to an image file of the primary image, is configured to carry the same file name as that of an image file of the aforementioned primary image so that it may become easy to search. Also configured is that, as described before, a file path of an image file of a reduced image and a file path of an image file of the primary image corresponding to the reduced image have different folder immediately under the root directory.

Incidentally, in the case of an image-use database file being already recorded in an area (i.e., the A or B area) which is set up as the currently used area and if a predefined condition, such as a capacity of the A area or the number of files stored therein is not met for example, the operation does not generate an image-use database file in the S9 and instead registers the generated image file of a reduced image with the image-use database file recorded in the area (i.e., the A or B area) which is set up as the currently used area, thereby updating the image-use database file.

Then it stores the image file of the primary image generated in the S8 in the HDD 10 (S10), followed by storing the image file of the reduced image and the image-use database file which have been generated in the S9 in the A or B area that is set up as the currently used area within the nonvolatile memory 5 (S11). However, if an image-use database file was not generated and if the image-use database file was updated in the S9, the operation stores the image file of the primary image in the HDD 10 and also stores only an image file of the reduced image at the nonvolatile memory 5. The detail of the process content of the S11 is described later by referring to FIG. 8.

Upon completing the process of the S11, the operation returns to the S3.

Comparably, after the S4 or if the judgment result of the S5 is "no", the operation then judges whether or not a mode instructed by the mode dial switch is the replay mode, that is, whether or not a change instruction to the replay mode has been received (S12). If the judgment result is "yes", it starts operation of the replay mode in the S21 and thereafter shown by FIG. 9.

Contrarily, if the judgment result of the S12 is "no", the operation then judges whether or not the power of the digital camera in turned off, that is, whether or not a power-off instruction has been received (S13). If the judgment is "no", the operation returns to the S3. If the judgment result is "yes", it then carries out a power off sequence for turning the power off following retracting the lens, saving the file in the process of writing, et cetera (S14). And the present flow ends.

FIG. 8 is a flow chart showing a detail of a process content of S11 for storing an image file of a reduced image and an image-use database file in the nonvolatile memory 5.

Referring to FIG. 8, as the present process starts, the operation first judges an identifier relating to the currently used area within the nonvolatile memory 5 (S21). It subsequently judges whether or not an identifier relating to the currently used area is the A area from the judgment result of the S21 (S22).

If the judgment result of the S22 is "yes", that is, if the currently used area is the A area, the operation stores the image file of the reduced image and the image-use database file which have been generated in the S9 (refer to FIG. 7) in the A area of the nonvolatile memory 5 (S23). In the case of not having generated an image-use database file in the S9 (i.e., the case of having updated the image-use database file), however, only storing the image file of the reduced image in the nonvolatile memory 5 is carried out.

The operation then judges whether or not a spare capacity remains in the A area (S24). If the judgment result is "yes", it returns the process to the S3 (refer to FIG. 7).

Contrarily, if the judgment result is "no", that is, if a spare capacity does not remain in the A area, the operation duplicates the image-use database file and the image file of a reduced image which are recorded in the B area into the HDD 10 only in the case of the B area within the nonvolatile memory 5 being not cleared, and clears the B area (S25). This makes the B area become a usable state.

Incidentally, associated with the duplication, the image-use database file is stored in the folder "SRCHDB", the image file of the reduced image is stored in the "DCIMDB", and the image file of the primary image is stored in the "DCIM", respectively in the HDD 10.

Here, the "DCIMDB" and "DCIM" are different folders positioned in a layer immediately under the root directory, the file paths of which are set up as only the layer immediately under the root directory being different so as to make it apparent that the image file of the primary image corresponds to that of the reduced image. Furthermore, attaching "DB" to the folder name "DCIM" storing the image file of the primary image makes the folder name "DCIMDB" storing the image file of the reduced image. That is, the file path of the image file of the reduced image and "file path" of the image-use database file are changed.

A primary image corresponding to a reduced image stored in the A or B area of the nonvolatile memory 5 is relatively recently photographed. A reduced image of the recently photographed primary image is recorded in the image-use database file. Due to this, if a search for the reduced image of the aforementioned recently photographed primary image is designated, it is possible to search the desired image in a high speed and also in a power save state because the search is only required for the A or B area of the nonvolatile memory 5. It is also possible to replay the searched reduced image quickly because the A or B area of the nonvolatile memory 5 stores the reduced image.

Upon completion of the process in the S25, the operation makes a value of the identifier "1", thereby designating the B area for the currently used area (S26).

Subsequently, associated with the duplication, it generates (or updates) a database-use database file so as to make the fact of the duplication apparent in the nonvolatile memory 5 and stores the aforementioned file in a common area (refer to FIG. 5) of the nonvolatile memory 5 (S27).

However, if the common area has already stored a database-use database file in this event, a database-use database file is not generated in the S27, and instead the duplicated image-use database file is registered with the database-use database file stored in the common area, thereby updating the database-use database file.

Registering the fact of registering the image-use database file in the HDD 10 in the database-use database file as described above makes it possible to best minimize an image search time in the case of searching in the HDD 10 in a later event. That is, if a database-use database file is not recorded in the nonvolatile memory 5, meaning that an image-use database file is not recorded in the HDD 10, and therefore an access to the HDD 10 is no longer required at the time of an image search. Meanwhile, if a database-use database file is recorded in the nonvolatile memory 5, meaning that an image search is enabled within the HDD 10 based on the image-use database file registered with the database-use database file, and therefore it is possible to eliminate a redundant access to the HDD 10. Accordingly, it is possible to improve an image search speed.

Then, upon completion of the process in the S27, the process shifts to the S3 (refer to FIG. 7).

Contrarily, if the judgment result of the S22 is "no", that is, if the currently used area is the B area, the operation then stores the image file of the reduced image and the image-use database file, which have been generated in the S9 (refer to FIG. 7), in the B area (S28). If an image-use database file was not generated in the S9 (i.e., the image-use database file was updated), however, the image file of the reduce image is only stored.

Then the operation judges whether or not a spare capacity remains in the B area (S29). If the judgment result is "yes", then it returns the process to the S3 (refer to FIG. 7).

Contrarily, if the judgment result of the S29 is "no", the operation duplicates the image-use database file and the image file of the reduced image, which are recorded in the A area, into the HDD 10, and clears the A area only in the case of the A area of the nonvolatile memory 5 not being cleared (S30). This makes the A area become a usable state. Incidentally at the time of the duplication, the image-use database file is stored in the folder "SRCHDB", the image file of the reduced image is stored in the "DCIMDB" and the image file of the primary image is stored in the "DCIM", all in the HDD 10, in the same manner as the above described S25.

Also associated with the duplication, the "file path" of the image-use database file is changed and the aforementioned image-use database file is updated because the file path of the image file of the reduced image is changed.

Upon completing the process of the S30, the operation then makes a value of the above described identifier "0", thereby designating the A area as the currently used area (S31). Then it generates a database-use database file registering the image-use database file which has been duplicated into the HDD 10 in the S30 and stores it in a common area of the nonvolatile memory 5 (S27).

In this event, if a database-use database file is already stored in the common area, however, a database-use database file is not generated in the S27, and instead the operation registers the duplicated image-use database file with the database-use database file stored in the common area, thereby updating the database-use database file.

Such a database-use database file makes it possible to best minimize a search within the HDD 10 at the time of searching an image in a later event and improve the image search speed as described above.

Also, in the case of searching a reduced image based on an image-use database file in the nonvolatile memory 5, the search is only required for the aforementioned nonvolatile memory 5, thereby enabling a high speed search as described above. Furthermore, the aforementioned nonvolatile memory 5 also stores a reduced image file, thereby enabling also a high speed replay of the searched image.

Upon completion of the process in the S27, the process returns to the S3 (refer to FIG. 7).

FIG. 9 is a flow chart showing a process content of an operation in the case of a judgment result of S1 shown in the above described FIG. 7 being a replay mode, or in the case of shifting to a replay mode as a result of a judgment of S12 shown in the above described FIG. 7 being "yes".

Referring to FIG. 9, as the present flow starts, the operation first replays an image file of the reduced image with the latest photographed data (i.e., the recording date) (S41). The image of the latest reduced image is certainly recorded in the nonvolatile memory 5. That is because an image file of a reduced image relating to an image file of the latest photographed primary image is always recorded in the nonvolatile memory 5 in the case of the image file of the primary image being recorded in the HDD 10 due to being photographed as the description of the flow chart shown in the above described FIG. 8 making it apparent. The HDD 10 is accordingly on the outside of the target of image search in this event, and therefore a time for reading the HDD for a read state and that for reading an image are not required in the case of replaying the last photographed image for example, thereby enabling a high speed image replay.

Then the operation judges whether or not a replay instruction for another image has been received from a user (S42). The replay instruction for another image is provided by the user instructing a designation of a photographed date of a replay target image, issuing a frame advance, et cetera, by way of the operation unit 15 for example.

If the judgment result of the S42 is "yes", the operation first searches in the image-use database file recorded in the A area or/and the B area of the nonvolatile memory 5 (S43). It then judges whether or not the image designated in the S42 is registered in the image-use database file which is recorded in the A area or/and the B area (S44).

If the judgment result is "yes", the operation reads the image file of the reduced image relating to the designated image in the S42 based on the image-use database file and replays it (S45), followed by returning to the S42.

In the case of the designated image by the frame advance being the next newest to the latest for example, it is also read from the nonvolatile memory 5 for replaying it because the image file of the reduced image relating to the aforementioned next newest image also has certainly been recorded in the nonvolatile memory 5.

Contrarily, if the judgment result of the S44 is "no", the operation then judges whether or not an image-use database file is recorded in the HDD 10 (S46). Note that the judgment is made based on whether or not a database-use database file registering the image-use database file is recorded in the common area of the nonvolatile memory 5 (refer to FIG. 5). That is, the judgment for the S46 is "yes" if the database-use database file is recorded, otherwise the judgment is "no".

If the judgment for the S46 is "no", the operation displays a message "designated image is not found" (S47), followed by returning to the S42.

Contrarily, if the judgment result for the S46 is "yes", the operation reads one unsearched image-use database file from the HDD 10 based on the image-use database files registered in the database-use database file (refer to FIG. 2) which is recorded in the common area of the nonvolatile memory 5 (S48).

Incidentally in the S48, if an image has been designated by a photographed date for example in the S42, the operation reads an image-use database file if the image-use database file, of which the designated photographed date is included in a period between the "earliest date" and "latest date", exists among the image-use database files registered in the database-use database file. In this case, if such an image-use database file does not exist, it is also possible to configure so that the process proceeds to the S47.

The operation then searches within the readout image-use database file and judges whether or not the image designated in the S42 is registered therein (S49).

If the judgment result is "yes", the operation then reads the image file of the reduced image relating to the image designated in the S42 based on the image-use database file and replays it (S50), followed by returning to the S42.

Contrarily, if the judgment result for the S49 is "no", it judges whether or not all the image-use database files recorded in the HDD 10 has been searched (S51). If the judgment result is "no", the process returns to the S51. Contrarily, if the judgment result is "yes", the operation displays a message "designated image is not found" (S52), followed by returning to the S42.

Contrarily, if the judgment result for the S42 is "no", it then judges whether or not a mode instructed by the mode dial switch is the photo mode, that is, whether or not an instruction for changing to the photo mode has been received (S53). If the judgment result is "yes", it then starts the process of the photo mode in the S2 and thereafter shown in FIG. 7.

Contrarily, if the judgment result for the S53 is "no", the operation then judges whether or not the power of the digital camera has been turned off, that is, whether or not the power off instruction has been received (S54). If the judgment result is "no", it returns to the S42. Contrarily, if the judgment result is "yes", it then executes the power off sequence process in the same manner as the S14 (S58), and thus the present flow ends.

As described above, the present embodiment enables a search for an image photographed relatively recently prior to a predefined period of time than the last photographed image by accessing to an image-use database file stored in the nonvolatile memory 5, thereby enabling a search and a display without accessing the HDD 10. Therefore, it enables the search and replay of a desired image in a high speed and low consumption current.

Even if a capacity of the nonvolatile memory 5 is relatively small, while a capacity of the HDD 10 is large, the present embodiment is configured to duplicate an image-use database file and an image file of a reduced image registered therewith stored in the nonvolatile memory 5 into the HDD 10 at every time when the spare capacity no longer exists in the process of storing the image-use database file and image file of the reduced image registered therewith, thereby allowing a use of the nonvolatile memory 5 again. Owing to this, even if the number of images to be managed becomes large, image files of primary images, along with image-use database files and image files of reduced images registered therewith can be stored up to the full capacity of the HDD 10. This enables an effective use of the HDD 10.

It is also configured to divide an area into a plurality of areas (i.e., two areas according to the present embodiment) for a sequential use, in lieu of one area, of the nonvolatile memory 5 recording image-use database files and image files of reduced images registered therewith enables an image-use database file registering an image file of a reduced image, which is a reduction of the recently photographed primary image, and an image file of a reduced image registered therewith to be in the state of being recorded in the nonvolatile memory 5. Owing to this, there is no possibility of duplicating all the image-use database files and image files of reduced images registered therewith into the HDD 10.

Note that the present embodiment may be configured in such a manner that the total number of registered image files of reduced images to be registered with an image-use database file is predetermined by the total number of registration per se for example. An alternative configuration may be to generate an image-use database file for every predefined photographing period of time, thereby determining the total number of registration according to the number of images photographed within the predefined photographing period of time.

The present invention has been described in detail thus far; it is, however, of course possible to carry out various improvements and changes within the scope of the present invention, in lieu of being limited by the above described embodiments.

As such, the present invention is contrived to build up a reduced image group and related data base individually for an input image group with at least one of the recent predefined period of time, a capacity, the number of frames, et cetera, as a parameter, thereby making it possible to search a desired recent reduced image in a high speed and low consumption current and perform a replay display. It is also contrived to build up a database for identifying a group to which an image belongs, even if the image is one on the outside of the aforementioned predefined period of time, thereby enabling a search for a desired image from among a very large number thereof recorded in the equipped large capacity recording medium in a relatively high speed and low consumption current.

What is claimed is:

1. An image management apparatus storing a primary image and a reduced image corresponding to the primary image, comprising:
    a first recording medium for recording the primary image when the primary image is input;
    a first database makeup unit for making up first database information for identifying a group to which the reduced image belongs when recording the primary image in the first recording medium;
    a second recording medium for recording the reduced image and first database information;
    a duplication unit for duplicating first database information and the reduced image recorded in the second recording medium into the first recording medium when the remainder capacity of, or the number of recorded files in, the second recording medium meets a predetermined condition;
    a second database makeup unit for deleting first database information and the reduced image which are duplicated into the first recording medium from the second recording medium and also making up second database information for identifying the duplicated first database information in the second recording medium;
    a first search unit for searching for a presence of the first database information in the second recording medium when a replay instruction for an image is provided by a user;
    a second search unit for searching a presence of the second database information made up in the second recording medium when the presence of the first database information in the second recording medium was not detected by the first search unit;
    wherein when a presence of the second database information is detected by the second search unit the first database information duplicated into the first recording medium is searched based on the second database information, and the reduced image to which the replay instruction is provided by the user is searched based on the first database information, thereby quickly searching the reduced image to which the replay instruction is provided by the user from the second recording medium based on the first database information when the first database information is present in the second recording medium, and searching a desired reduced image from among the images recorded in the first recording medium when the first database information is not present in the second recording medium.

2. The image management apparatus according to claim 1, wherein
    a file path for identifying the reduced image within the first database information which is made up in the second recording medium is different from a file path for identifying the reduced image duplicated into the first recording medium only by folder names positioned immediately under the root directory.

3. The image management apparatus according to claim 2, wherein
    a name of a folder positioned immediately under the root directory corresponding to a file path for identifying the reduced image duplicated into the first recording medium includes a name of a folder positioned immediately under the root directory corresponding to a file path for identifying the reduced image within the first database information which is made up in the second recording medium.

4. The image management apparatus according to claim 1, expressing
    a file path for indicating an existence position of the primary image recorded in the first recording medium on the first recording medium and a file path for indicating an existence position of the reduced image recorded in the second recording medium on the second recording medium in the same description.

* * * * *